Nov. 24, 1942.  L. WERNSTEDT  2,303,099
PLOTTING INSTRUMENT
Filed May 29, 1941  7 Sheets-Sheet 1
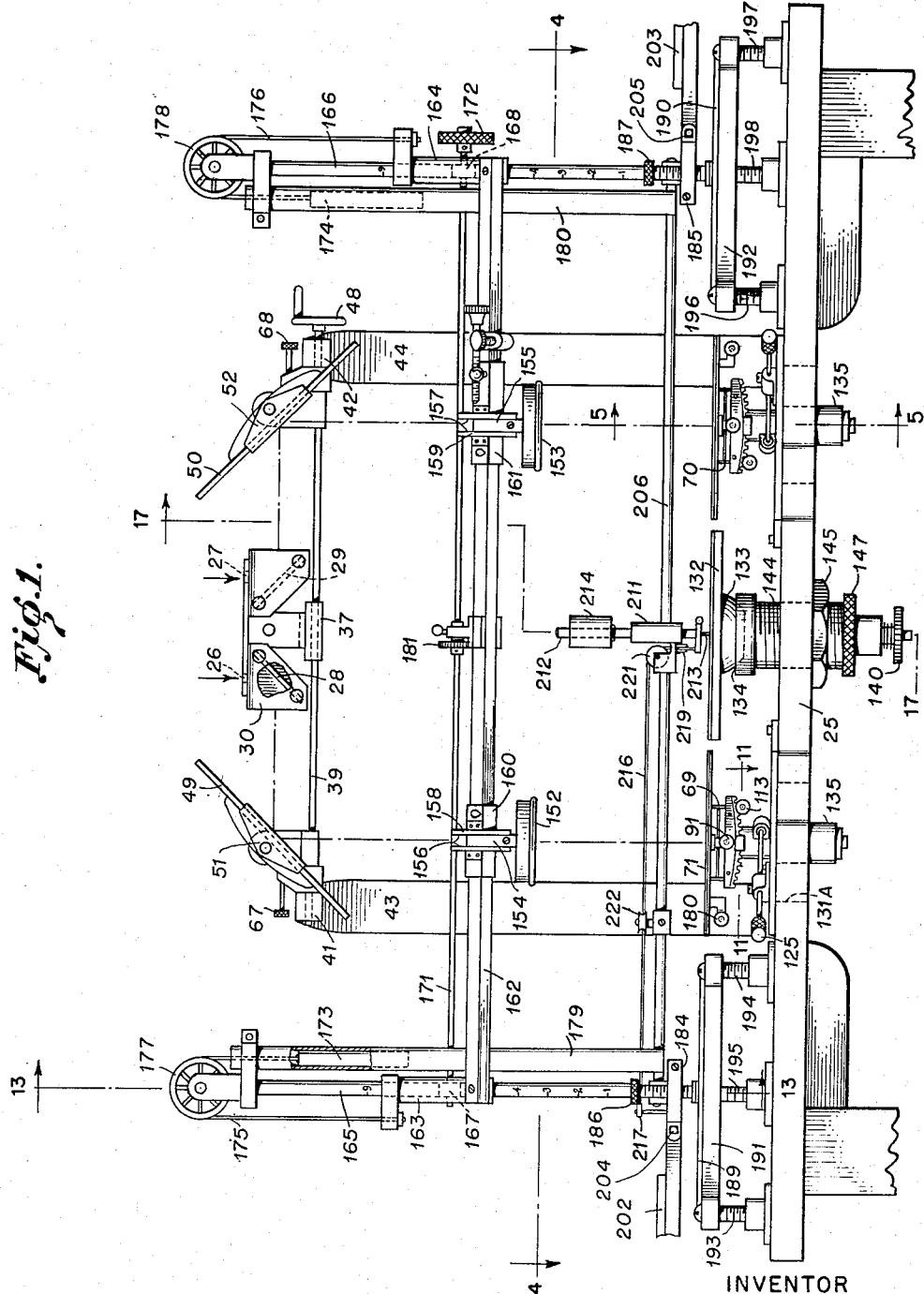
INVENTOR
LAGE WERNSTEDT
BY
ATTORNEYS Nov. 24, 1942.  L. WERNSTEDT  2,303,099
PLOTTING INSTRUMENT
Filed May 29, 1941    7 Sheets-Sheet 2
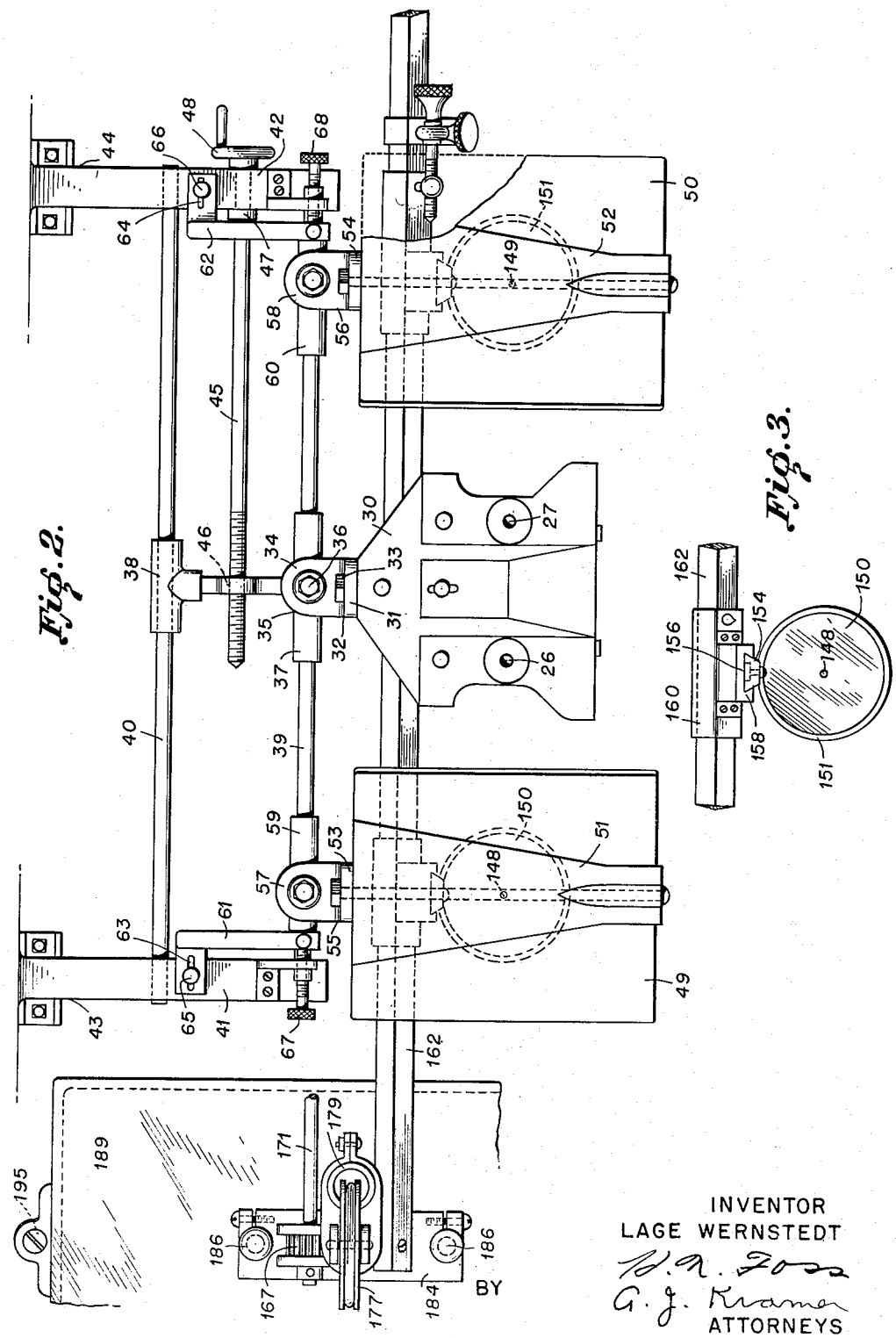
INVENTOR
LAGE WERNSTEDT
ATTORNEYS Nov. 24, 1942.     L WERNSTEDT     2,303,099
PLOTTING INSTRUMENT
Filed May 29, 1941     7 Sheets-Sheet 3
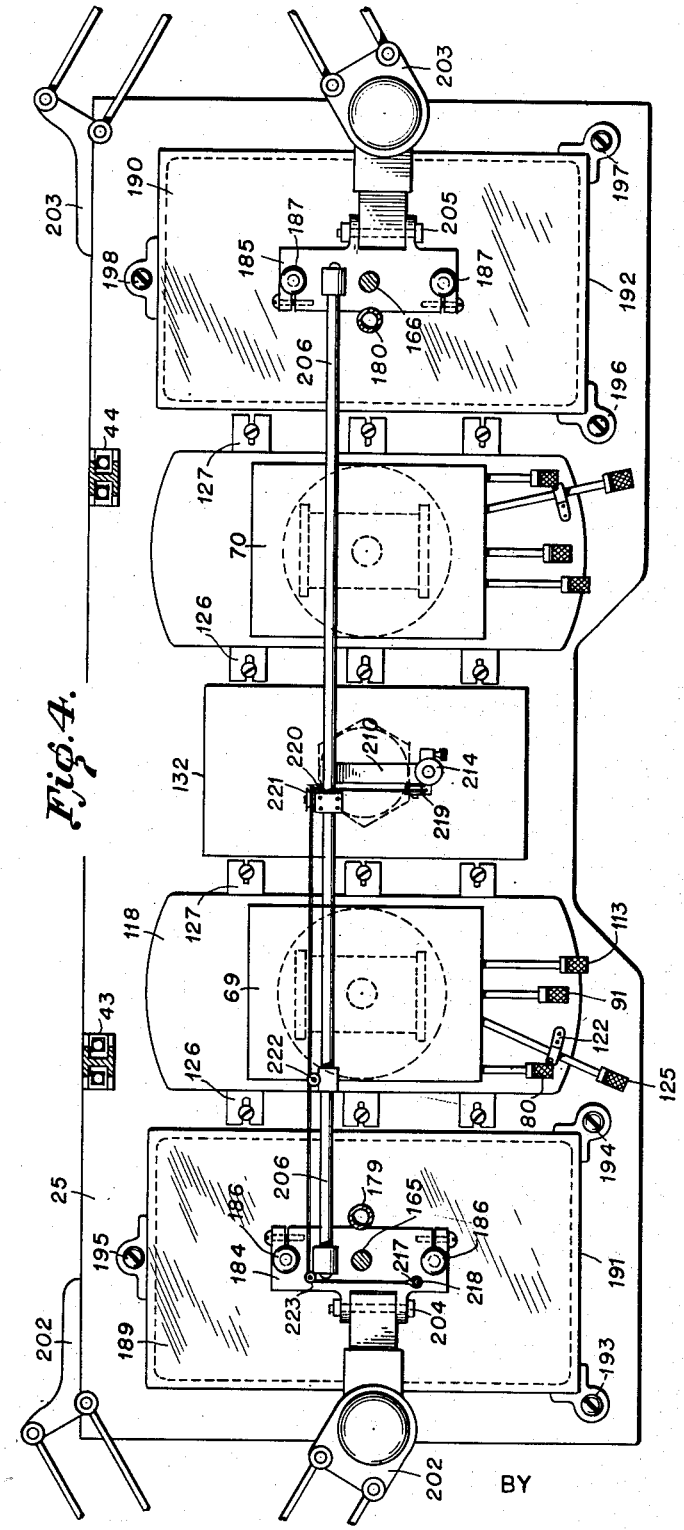
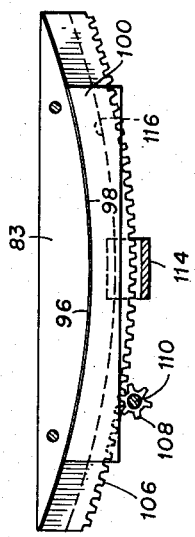
INVENTOR
LAGE WERNSTEDT
BY
ATTORNEYS

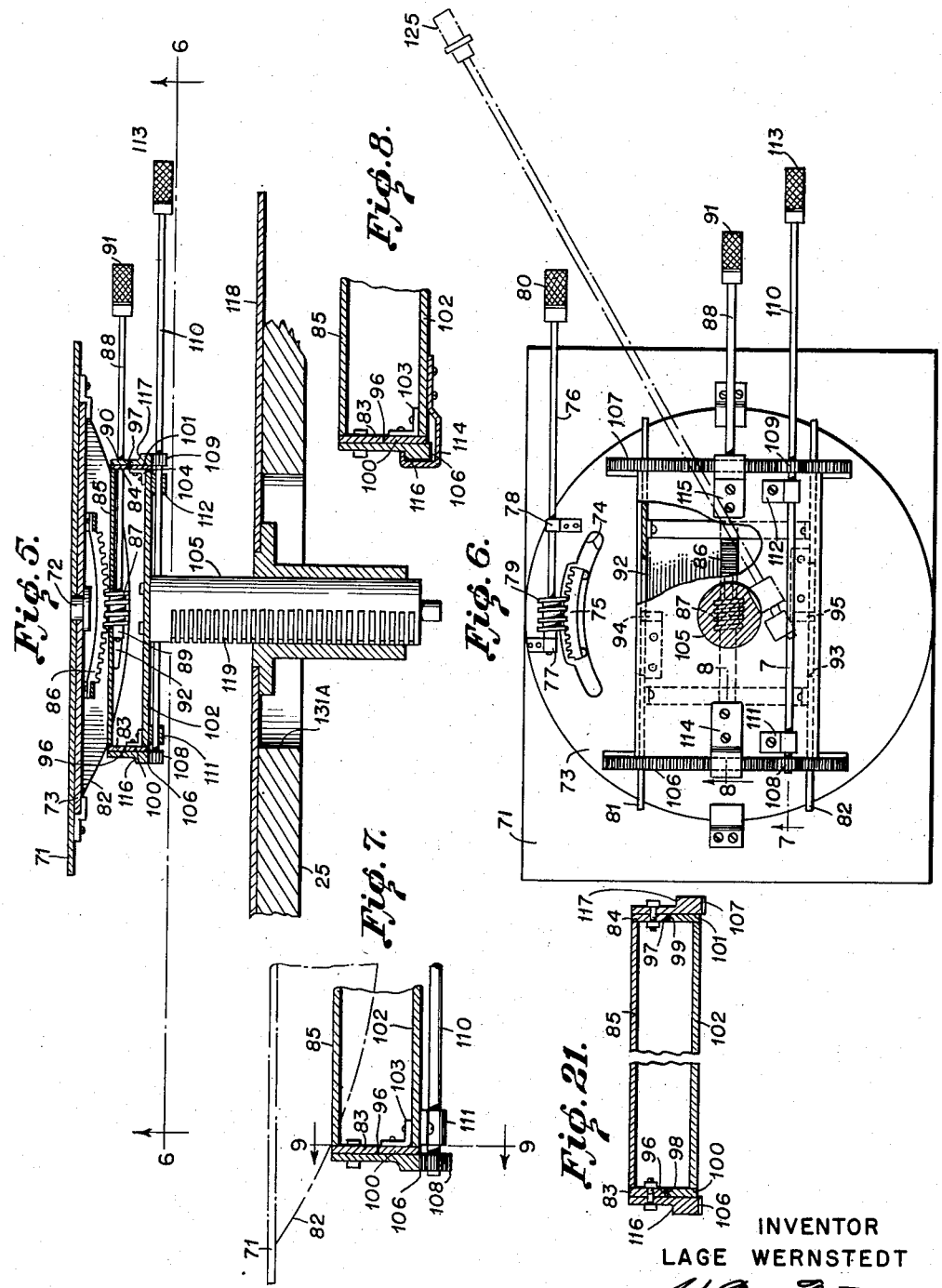

Nov. 24, 1942.   L. WERNSTEDT   2,303,099
PLOTTING INSTRUMENT
Filed May 29, 1941   7 Sheets-Sheet 5
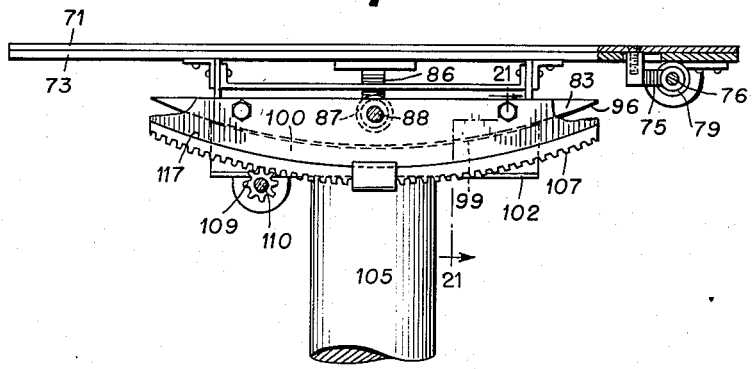
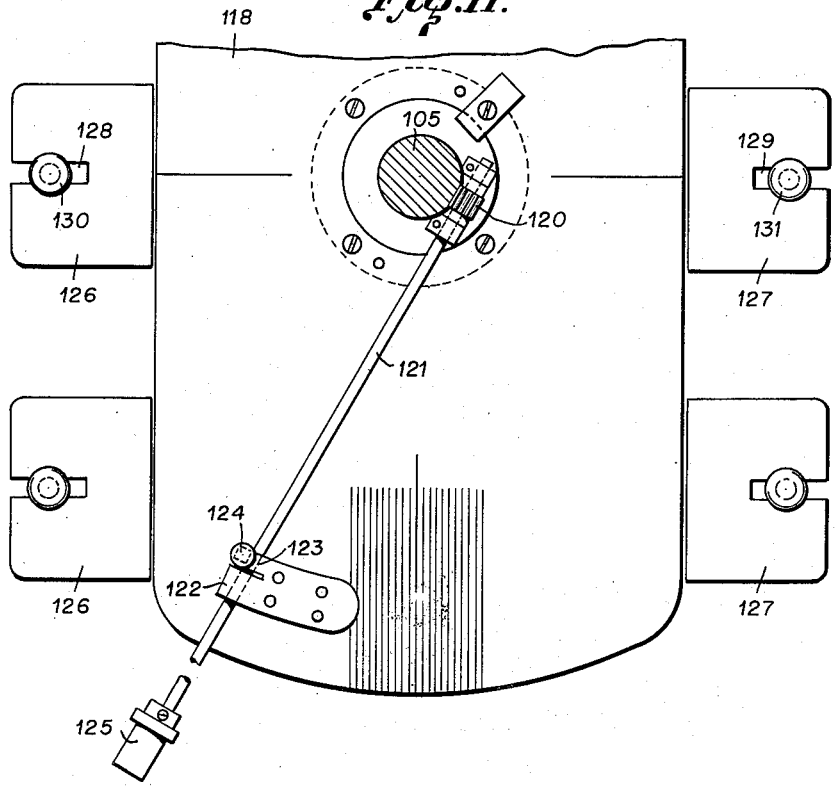
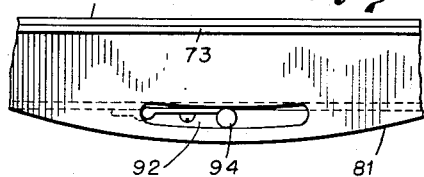
INVENTOR
LAGE WERNSTEDT
BY
ATTORNEYS Nov. 24, 1942.　　L. WERNSTEDT　　2,303,099
PLOTTING INSTRUMENT
Filed May 29, 1941　　7 Sheets-Sheet 6
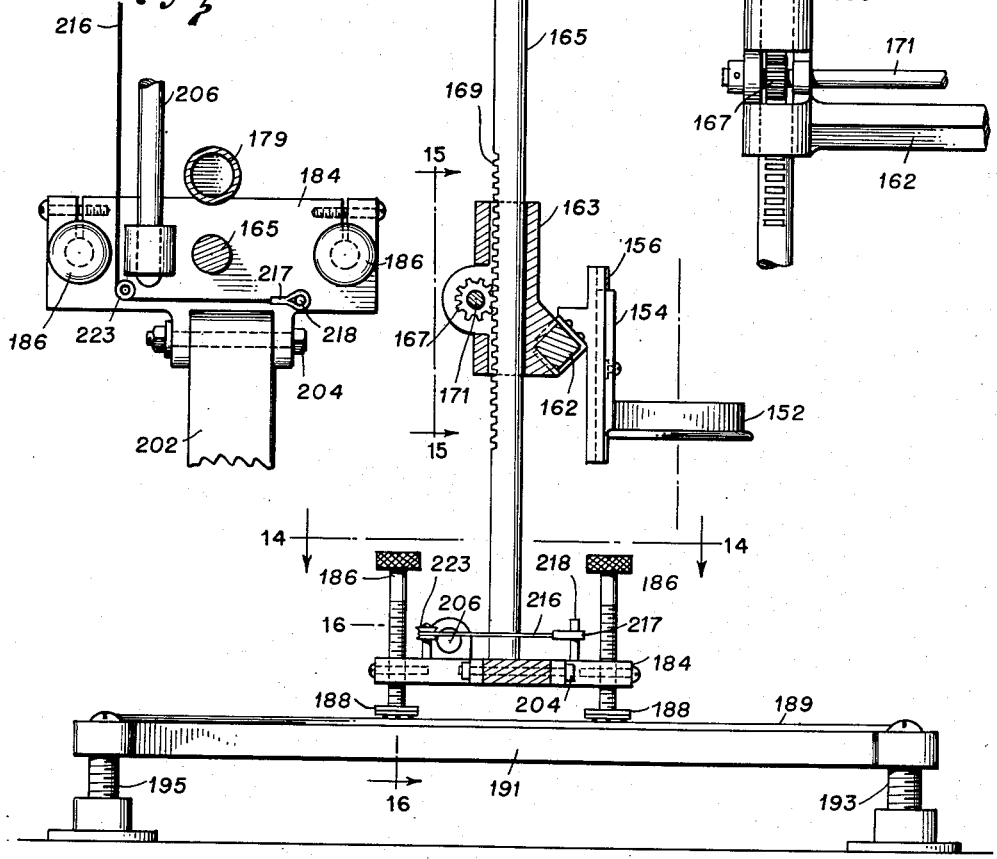
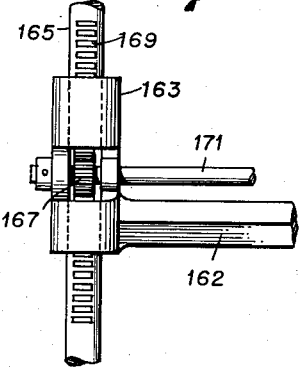
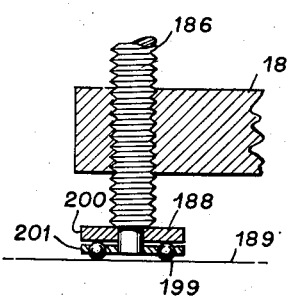
INVENTOR
LAGE WERNSTEDT
BY
ATTORNEYS Nov. 24, 1942.　　　L. WERNSTEDT　　　2,303,099
PLOTTING INSTRUMENT
Filed May 29, 1941　　　7 Sheets-Sheet 7
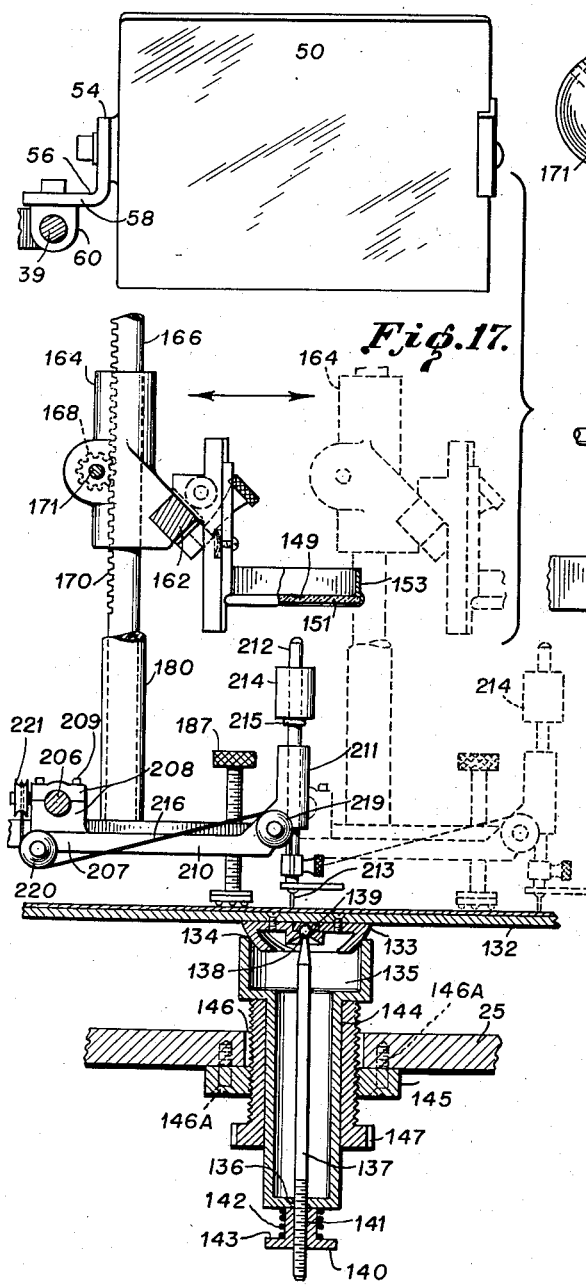
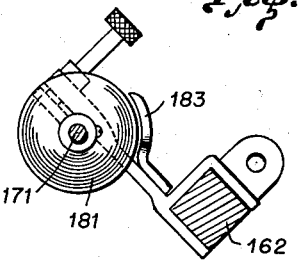
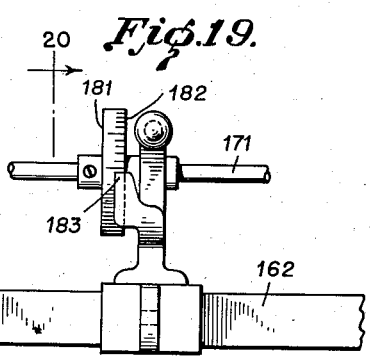
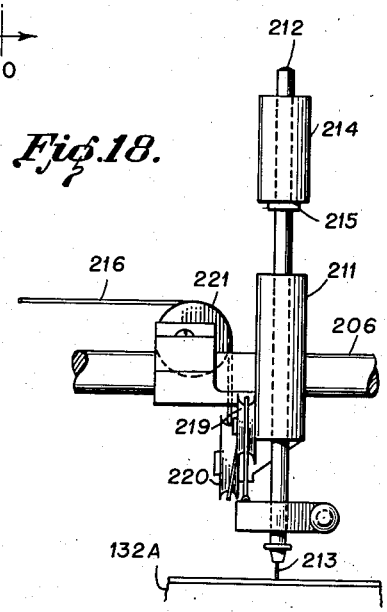
INVENTOR
LAGE WERNSTEDT
BY
ATTORNEYS Patented Nov. 24, 1942

2,303,099

UNITED STATES PATENT OFFICE 2,303,099

PLOTTING INSTRUMENT

Lage Wernstedt, Portland, Oreg.

Application May 29, 1941, Serial No. 395,736

8 Claims. (Cl. 33—20)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to photogrammetry generally and the principal object is the provision of an instrument in which a pair of vertical photographs having a stereoscopic overlap can be viewed stereoscopically and maps fabricated giving the topography and planimetry of observed relief images. Such devices are generally referred to as stereoscopic plotting instruments.

The nature of vertical photographs taken of uneven terrain is that objects closer to the camera are on a larger scale than those farther away. Another object of this invention is the provision of an instrument by means of which a topographic map of uniform scale can be made from such pictures notwithstanding such scale variations in each picture.

The following description, considered together with the accompanying drawings, will more fully disclose this invention and further objects and advantages thereof will be apparent.

In the drawings:

Figure 1 is a front elevational view illustrating the general arrangement of parts of an embodiment of my invention, partly broken away.

Figure 2 is a partial top plan view.

Figure 3 is a plan view showing one of the index marks and the means of supporting it on its guide bar, said bar being shown fragmentarily.

Figure 4 is a section along the line 4—4 of Figure 1.

Figure 5 is a section along the line 5—5 of Figure 1.

Figure 6 is a section along the line 6—6 of Figure 5.

Figure 7 is an enlarged section along the line 7—7 of Figure 6.

Figure 8 is an enlarged section along the line 8—8 of Figure 6.

Figure 9 is a section along the line 9—9 of Figure 7.

Figure 10 is an enlarged front elevational view of one of the phototables, partly in section.

Figure 11 is a fragmentary plan view along the line 11—11 of Figure 1.

Figure 12 is an enlarged fragmentary view illustrating the means for holding the runners 81 and 82 in position.

Figure 13 is a partial section along the line 13—13 of Figure 1.

Figure 14 is a fragmentary plan view along the line 14—14 of Figure 13.

Figure 15 is a fragmentary view taken along the line 15—15 of Figure 13.

Figure 16 is an enlarged section along the line 16—16 of Figure 13.

Figure 17 is a section along the line 17—17 of Figure 1. The broken lines shown illustrate the relative position of parts when the floating mark carriage is moved forward.

Figure 18 is an enlarged fragmentary view illustrating the tracing point assembly as viewed in Figure 1.

Figure 19 is an enlarged fragmentary view of Figure 1 showing in detail the wheel scale 101 and pointer 103.

Figure 20 is a section along the line 20—20 of Figure 19.

Figure 21 is a section along the line 21—21 of Figure 10.

Referring with more particularity to the drawings in which like numerals designate like parts, the embodiment illustrated is mounted on a suitable working table 25 over which is disposed a stereoscope consisting of a pair of horizontal eyepieces 26 and 27 beneath which are mounted the usual eye mirrors 28 and 29. These mirrors may be either plane-surfaced mirrors or prisms. The drawings illustrate them as plane-surfaced mirrors which are preferably of first surface reflection. The eyepieces 26 and 27 and mirrors 28 and 29 are co-mounted on a frame 30 which is horizontally pivoted to the vertical arm 31 of an angle bracket 32 and held in adjusted positions by means of a clamping bolt 33. The horizontal arm 34 of said bracket is vertically pivoted to a carriage 35 and held in adjusted positions by means of a clamping bolt 36. The carriage 35 carries horizontal sleeves 37 and 38 which are co-slidable on parallel front and rear bars 39 and 40, respectively. The bars 39 and 40 are fixed to the arms 41 and 42 of upright supports 43 and 44, respectively. The uprights 43 and 44 are fixed to the table 25 as shown. The slidable relation of the carriage 35 on the bars 39 and 40 is controlled by a shaft 45 threaded at one end to engage a threaded aperture 46 of the carriage 35, the other end being rotatably supported in a suitable bearing 47 on the arm 42. This end of the shaft 45 extends through the bearing 47 to which is secured a hand wheel 48 for manually imparting rotation to said shaft.

On the forward bar 39, the wing mirrors 49 and 50 of the stereoscope are mounted. These wing mirrors are held in frames 51 and 52 which are pivoted to the vertical arms 53 and 54 of angle brackets 55 and 56. The horizontal arms 57 and 58 of said brackets are pivoted to sleeves 59 and 60, which sleeves are slidable on the said bar 39. Arms 61 and 62 are fixed to sleeves 59 and 60 and are provided with horizontal slots 63 and 64 engaging the stem of vertical head screws 65 and 66, mounted on the arms 41 and 42. Adjusted positions of the sleeves 59 and 60 are set by means of abutment screws 67 and 68 mounted through the arms 41 and 42 to abut the outer sides of the sleeves 59 and 60. By these means, adjustments of the mirrors 49 and 50 in the horizontal direction along the bar 39 are permitted within the limits of the slots 63 and 64 by changing the positions of the abutment screws 67 and 68 and a levelling adjustment is obtained by changing the position of screws 65 and 66. The mirrors 49 and 50 can also be pivoted horizontally and vertically by means of the pivoted connections with the brackets 55 and 56 to bring them parallel to the eyepiece mirrors 28 and 29.

Beneath the wing mirrors 49 and 50, phototables 69 and 70 are mounted on the table 25 for supporting the stereoscopic pictures. Each table comprises a platen 71 rotatable on a vertical shaft 72 fixed to the center of a disc 73. The disc 73 is provided with a curved slot 74 through which an arcuated rack 75 is disposed, said rack being fixed to the bottom of the platen 71. A shaft 76, rotatable in bearings 77 and 78 on the bottom of the disc 73, carries a worm 79 engaging said rack 75. This shaft 76 extends outward to the front of the table 25 and is provided with a knob 80 for manually imparting rotation.

To the bottom of the disc 73 there are fixed a pair of circular runners 81 and 82, the center of curvature of which will be defined hereinafter. These runners are supported and slide on the top edge of vertical plates 83 and 84 which are secured to a horizontal plate 85 extending between the runners 81 and 82.

Between the runners 81 and 82 there is fixed to the bottom of the disc 73 a rack 86 having a curvature parallel to the curvature of said runners. The rack 86 engages a worm 87 which is fixed to a shaft 88. The shaft 88 is rotatably mounted in a bearing 89 which is secured to the bottom of the plate 85 and a bearing 90 through the vertical plate 84. The shaft 88 extends to the front of the instrument where it is provided with a knob 91 for imparting manual rotation. The runners 81 and 82 are held against the vertical plates 83 and 84 by means of curved slots 92 and 93 through the runners 81 and 82 engaging pins 94 and 95 projecting laterally from the plate 85. The bottoms of the vertical plates 83 and 84 are cut to form circular convex runners 96 and 97 which slide in complementary concave bearing surfaces 98 and 99 on top of vertical plates 100 and 101. The plates 100 and 101 are fixed to a horizontal plate 102 by means of angle braces 103 and 104, said plate 102 being secured to the top of a vertical post 105. To the outer sides of the vertical plates 83 and 84 racks 106 and 107 are secured, said racks having a curvature concentric with the runners 96 and 97. Pinions 108 and 109 mesh with the racks 106 and 107 and are fixed to a common shaft 110 rotatably mounted in bearings 111 and 112, said bearings being fixed to the bottom of the horizontal plate 102. The shaft 110 extends to the front of the table 25 and is provided with a knob 113 for imparting manual rotation. The racks 106 and 107 are held in contact with the pinions 108 and 109, and the runners 96 and 97 are held engaged with the bearing surfaces 98 and 99 by means of arm hooks 114 and 115, one end of each of which is fixed to the bottom of plate 102 from which they extend outward under the racks 106 and 107, thence upward, and thence inward to bear upon shoulders 116 and 117 of said racks 106 and 107.

The centers of curvature of the runners 81 and 82 and runners 96 and 97 are determined by trial and error to be the point about which a picture placed on the platen 71 should be turned to bring the visual rays of the stereoscope in coincidence with the corresponding horizontal and vertical position of the points of the optical model with the least error. These centers are preferably determined graphically by constructing a diagram of the images of points representing a picture and their corresponding positions in the spatial model, thence, determining the position of the picture points which will bring the rays from the stereoscope in coincidence with the corresponding points of the model with the least error. The point about which the picture points should swing to obtain this condition is the center of curvature in each case and the distance of the runners 81 and 82, and 96 and 97 from this center determines their radii. The center of curvature in each case, i. e., for both the runners 81 and 82 and the runners 96 and 97, will be at the same vertical distance above the platen 71.

The post 105 is mounted through a horizontal plate 118 and is provided with a rack 119 engaging a pinion 120. The pinion 120 is fixed to one end of a shaft 121, the other end extending to the front of table 25 through a bearing 122 and a clamp 123. Said clamp is set and released by means of a screw 124, whereby the shaft 121 can be releasably held in different positions of rotation to prevent vertical movement of the phototable assembly after adjustment. The shaft 121 carries a knob 125 for manually imparting rotation when the clamp 123 is released.

The sides of the plate 118 are straight edges and are slidable between guides 126 and 127. These guides are laterally adjustable by means of slots 128 and 129 engaging hold-down screws 130 and 131 on the table 25. A large opening 131A is provided through table 25, through which the lower part of the post 105 projects, said opening being large enough to permit freedom of movement of said post when said plates are moved in different positions within the limits of adjustments desired.

Between the phototables 69 and 70 there is mounted the map table 132, upon which the map to be made is drawn. The map table 132 is fixed to a spherical bearing 133, the spherical surface of which is in slidable contact with the upper rim of a collar 134. The collar 134 is integral with the top of a hollow vertical tube 135, the bottom of which is closed except for an aperture 136 through which a rod 137 is axially disposed. The upper end of the rod 137 is fixed to a ball 138, said ball being disposed in a socket 139 integral with the map table 132. The lower end of the rod 137, extending through the aperture 136, is threaded to engage a nut 140, said nut 140 having a shank 141 which abuts the lower end of the tube 135. About the shank 141, there is disposed a spring 142 between the flanged head 143 of the nut 140 and the bottom of the tube 135 for the purpose of applying a downward pressure against the nut 140. By tightening the nut 140, the table 132 is held in a fixed position and by loosening it the table is released from the fixed position and may be tilted and tipped. In this released position, spring 142 acts to create a drag to the movement of the table 132.

The tube 135 is mounted in a sleeve 144, which is disposed through an aperture 146 of the table 25. The collar 134 rests on top of said sleeve. The outer side of the sleeve 144 is threaded and engages a nut 145 fixed to the bottom of the table 25 by means of screws 146A, or any other suitable means. The sleeve 144 is provided with a knurled flange 147 for manually rotating it to change the elevation of the sleeve together with the tube 135 and the map table 132. The map table 132 is leveled by loosening the nut 140, permitting it to be tipped and tilted into a level position with the assistance of a level bubble (not shown), after which the nut 140 is tightened to increase the friction between the bearing 133 and the collar 134, sufficient to prevent movement under the pressure of the tracing point, hereinafter described.

Between the phototables 69 and 70 and the wing mirrors 49 and 50, index marks 148 and 149, etched or otherwise provided on thin transparent discs 150 and 151 of glass, or some other suitable material, are disposed. These marks are preferably of a color contrasting with the color or colors of the photographs to be used, and are mounted on a carriage as follows: The discs 150 and 151 are mounted in frames 152 and 153 which are supported vertically on beveled arms 154 and 155. These beveled arms are vertically slidable in dovetailed grooves 156 and 157 of brackets 158 and 159 with a friction fit and said brackets are fixed to sleeves 160 and 161 on a horizontal bar 162. The ends of bar 162 are fixed to vertical sleeves 163 and 164 which operate on racked vertical columns 165 and 166. Mounted on said sleeves 163 and 164 are pinions 167 and 168 engaging the racks 169 and 170 of said columns. These pinions are fixed to a shaft 171, one end of which is provided with a hand wheel 172, the rotation of which causes the sleeves 163 and 164 to move vertically on the columns 165 and 166, together with the bar 162 and index marks 148 and 149 attached thereto. The bar 162, sleeves 160 and 161, and parts movable therewith on the columns 165 and 166 are counter-balanced by means of counterweights 173 and 174 connected to the sleeves 160 and 161 by cables 175 and 176 operating over pulleys 177 and 178 on the top of columns 165 and 166. The counterweights 173 and 174 operate in vertical guide tubes 179 and 180 clamped or otherwise secured to the columns 165 and 166. Fixed to shaft 171 is a wheel 181 having a graduated scale 182 on its rim. A pointer 183, fixed to the bar 162, extends in juxtaposition to the said scale 182. By these means the index marks 148 and 149 can be set at any desired height.

The columns 165 and 166 are fixed to foot plates 184 and 185, which are rigidly secured to the ends of a stiff rod 206. Said foot plates are threadedly engaged with vertical posts 186 and 187. To each of the posts 186 and 187 there is attached a foot 188 which slides over one of the plane surfaces 189 and 190, there being one of said surfaces for each of the columns 165 and 166. The plane surfaces 189 and 190 are preferably of smooth plate glass, hard metal, or some other suitable material, to reduce friction. These surfaces are mounted on tables 191 and 192, which tables are supported on levelling screws (preferably three for each table) 193, 194, and 195, and 196, 197, and 198. Each foot 188 comprises ball bearings 199 disposed between the plane surface and a thrust collar 200 secured to the bottom of the foot, said ball bearings being held in position by a mounting 201.

The index marks 148 and 149 are maintained in lateral alignment, parallel to the base line or direction of correspondence of the stereoscopic pictures, by means of a suitable parallelism mechanism. The mechanism illustrated comprises two drafting machines 202 and 203 of a conventional type, one end of each of which is fixed to the table 25, the other end being hinged to one of the foot plates 184 and 185 by means of hinge pins 204 and 205, substantially as illustrated. Consequently, once the index marks are set their co-movement is constrained to positions parallel to every other position.

On said rod 206 a bracket 207 is slidably mounted by means of a split sleeve 208 which may be tightened and loosened about the rod 206 by means of bolts 209 to clamp the bracket 207 in different positions along said rod 206. However, any other suitable clamping means may be provided. A forwardly extending arm 210 projects from the bracket 207, to which arm there is secured a vertical sleeve 211 in which a vertical post 212 is slidably mounted. The lower end of the post 212 is provided with a tracing point, such as a pencil, pen, or other stylus, 213 adapted to contact the top surface of the map table 132. A weight 214 is mounted on the upper end of the post 212 resting on an abutment shoulder 215 for the purpose of applying pressure on the tracing point 213 against the map table 132. When not in use, the tracing point can be elevated out of contact with the map table 132 by means of a flexible cable 216 having one end fixed to the lower end of the post 212 and the other end to a ring 217 which may be slipped over a pin 218 on the foot plate 184. Sheaves 219, 220, 221, 222, and 223 guide the cable from the post 212 to the ring 217.

In operation, the stereoscope is adjusted in proper position with the winged mirrors 49 and 50 set parallel to and equidistant from their respective eye mirrors 28 and 29 directly over the phototables 69 and 70, the visual distances of each eye of the operator to the respective centers of the phototables being equal while the phototables are in a level position. These mirror adjustments are made possible by virtue of the fact that the wing mirrors are movable laterally along the bar 39 and tiltable in two directions on the angle brackets 55 and 56. The phototables are adjusted by turning the knobs 113, 91, and 125 for tilt, tip and elevation and by changing the position of the plates 118 between the guides 126 and 127.

The plane surfaces 189 and 190 are then leveled in the same horizontal plane normal to the visual axes of the stereoscope by means of the levelling screws 193, 194, and 195, and 196, 197, and 198. The columns 165 and 166 are then made perpendicular to the plane surfaces 189 and 190 by adjusting the posts 186 and 187. By these adjustments, the index marks 148 and 149 are made to move precisely vertical and parallel to the visual axes of the stereoscope when the bar 162 is moved on columns 165 and 166.

The map table 132 is then leveled and a pair of stereoscopic photographs are mounted, each on one of said phototables 69 and 70. The type of photographs usually employed is vertical aerial photographs that have a stereoscopic overlap. The center of each photograph is made to coincide with the center of its corresponding phototable. The photographs are fixed in this position to their phototables by any suitable means, such as ordinary spring clips, Scotch tape, and so forth. A writing surface, preferably a piece of transparent or translucent paper, such as vellum, is similarly mounted on top of the map table 132.

This completes the preliminary adjustments of the instrument for making either a planimetric map or a contour map.

To use the instrument for making planimetric maps, the phototables 69 and 70 are held level and the index marks 148 and 149 are aligned so that each is viewed through the stereoscope over the center of its corresponding phototable. In accomplishing this, only one eye is used at a time so that the index marks will not appear stereoscopically. Then, one of the index marks, for example, index mark 148, is moved toward the other index mark 149 on the bar 162 to a point between the center of phototable 69 and the side thereof adjacent the map table 132 until both marks appear when viewed through the stereoscope with both eyes either to fuse or to be in alignment in the direction normal to the line of centers of the photographs.

If the marks do not appear to be sharply fused, that is, if they appear to be blurred, then the phototable 69 is turned or swung by rotating the knob 80 until the index marks appear fused and sharply defined the while maintaining the stereoscopic overlap of the two photographs in clear relief as a spatial model. This is possible because, due to the tolerance of the eyes, stereoscopic pictures need only be brought into an approximate optimum position for seeing a sharply defined relief or spatial model. This fused image is commonly referred to as the floating mark. In this position the floating mark may appear to be displaced either above or below the surface of the spatial model at that point.

In this position, the index mark 149 is directly over the center of the photograph on the phototable 70 and the index mark 148 is directly over the same object as it is represented in the photograph on the phototable 69. In this position, the floating mark may appear to be displaced either above or below the surface of the spatial model at that point. This displacement is then eliminated by elevating or lowering the bar 162, as the case may be, until the floating mark appears to be in contact with the surface of the model at that point.

Then the index marks 148 and 149 are moved in unison laterally in the direction of the phototable 69 and up or down on the columns 165 and 166 until the floating mark, which will become blurred, appears approximately to contact the surface of the model at the center or at a well defined image point near the center of the photograph on the phototable 69. Then the other phototable 70 is turned until the floating mark again appears sharply defined through the stereoscope.

The map can be made on any chosen scale by changing the height setting of the index marks 148 and 149 and readjusting their spread to correspond with the change in height. The higher the index marks for a given setting, the smaller the scale. A higher position of the floating mark requires that the index marks be spread farther apart to bring the floating mark in contact with the surface of the model at any given point.

The instrument is now adjusted for making the planimetric map. The floating mark carriage is moved over the plane surfaces 189 and 190 to where the floating mark appears to contact the surface of the model at a point on the extreme end of a planimetric line, say a drainage line, and ring 217 is released from the pin 218 to permit the tracing point to contact the map table. Then, the carriage is moved so that the floating mark follows the selected planimetric line of the model, the while continually changing the elevation of the floating mark by turning the hand wheel 172 to cause the floating mark to appear to contact the surface of the model at every point along the planimetric line traversed.

When this traverse is completed, the tracing point is elevated by pulling the ring 217 and another planimetric line is selected for which the same procedure is followed. This is repeated for every desired planimetric line of the model until the map is completed.

To use the instrument for making topographic or contour maps, the same preliminary adjustments are made as described above. The photographs are then adjusted in correspondence relative to each other in the usual manner by swinging, tipping, and tilting the phototables with the knobs 80, 125, and 113. In this position the spatial model may not be in the true horizontal position, i. e., the model may be tilted or tipped so that the contours thereof are not truly horizontal. It is, therefore, necessary to horizontalize the model and thus to bring it in absolute orientation, while making any minor adjustments necessary to retain relative correspondence. The method of horizontalizing a spatial model by the use of basic reference points is well known to the art and is described in numerous works. See Photogrammetry News Letter, No. 3, volume 2 of 1936 and "Ernfuhrung in die Luft-und Erdbildmessung" by K. Schwidefsky, pps. 82 to 86, which discuss the major operation of bringing photographs into relative orientation.

The instrument is now set for making the contour map. The height of the index marks 148 and 149 is set so that the floating mark appears to contact the model at a point whose elevation is the same as the elevation at which a contour line is desired and the tracing point 213 is lowered in contact with the map table 132. Then the carriage is moved so that the floating mark at the height setting of the index marks appears constantly to contact the model at each change of position. In this manner the carriage follows the line of constant elevation. This movement is transmitted to the tracing point 213 which traces out the form line on the map table. When one contour line has been mapped, the height setting of the floating mark is changed by raising or lowering the bar 162 to the next contour elevation desired and the procedure repeated. This is done for each desired contour.

The present invention differs in principle from prior devices of a similar character employing two index marks in that these marks are vertically movable. This permits placing the floating mark in contact with different points on the model without spreading the index marks on the instrument. By holding the distance between the index marks constant and only changing their elevation, the map produced is on a uniform scale because the scale of the vertical pictures is larger with increased height of ground in inverse proportion. This is not true in the case of instruments where the index marks are held at a constant elevation and only a variation in their spread is possible, in which case there can be reproduced only a map having the same scale variation as the stereoscopic pictures. A higher setting of the index marks just compensates for an increased picture scale and, conversely, a lower setting just compensates for a decreased picture scale. To illustrate this point, if the index marks were in contact with the photographs, a contour line would be traced out on the scale of the photographs. Since the photograph shows the objects in different scales at different elevations, the map would likewise show the same scale variations. However, if the index marks are elevated so that the floating mark coincides with a right section of the cone of rays of a particular object of the model, the scale will be reduced proportionately as the altitude of the cone of rays is to the altitude of the section. This proportion is exactly inverse to the proportion of the scales of the photographs at the corresponding elevations.

As stated differently, the model is always on a uniform vertical scale regardless of how much it is stretched, and, since the operator can make the floating mark contact the model at any point by simply raising and lowering the index marks, the contours drawn at every elevation will be on a uniform scale.

By making the eye distance from the stereoscope to the phototables greater than the focal length of the stereoscopic pictures to be viewed, a greater vertical mapping range is obtained than if the eye distance were equal to or less than this focal distance, although the model will appear to be vertically stretched. The greater the distance of the eye position, the greater is the vertical mapping range and this distance should preferably be large enough to permit operations on the highest altitude differentials to be encountered.

Having thus described my invention, I claim:

1. In a plotting instrument of the character described having a stereoscope, tables for supporting stereoscopic pictures and reference marks between and independent of said stereoscope and said tables, said marks being movable in three coordinate directions, a carriage supporting said marks in spaced relation, and a mechanism constraining said carriage to move so that every position of said marks is parallel to every other position, said carriage having a stylus attached thereto in cooperative relation with a mapping surface.

2. In a plotting instrument of the character described having a stereoscope, tables for supporting stereoscopic pictures, transparent discs, and index marks on said discs in a vertical plane between said stereoscope and said table, frames for mounting said discs, vertical arms secured to said frames, a horizontal bar, sleeves slidable on said bar, one for each index mark, said arms being vertically slidable on said sleeves, vertical posts at the ends of said bar, means for slidably supporting said bar on said posts, means for vertically moving said bar on said posts, means for holding said bar in different positions along said posts, a rod secured to said posts, a stylus secured to said bar, a mapping surface in cooperative relation with said stylus, and means constraining the movements of said posts and rod horizontally and co-directionally.

3. In a plotting device having means for mounting stereoscopic pictures, a stereoscope for viewing said pictures, a pair of reference marks between said mounting means and said stereoscope, a mapping surface and a stylus; a carriage for supporting said marks in the field of view of the stereoscope, said carriage being movable in a plane normal to the visual axes of the stereoscope, means for moving said marks on said carriage parallel to said visual axis, and means constraining said carriage to move so that every position of said marks is parallel to every other position, said stylus being attached to said carriage for tracing lines on said mapping surface in accordance with the movements of said carriage.

4. In a plotting device having means for mounting stereoscopic pictures, a stereoscope for viewing said pictures, a mapping surface, a stylus and a pair of spaced reference marks between said mounting means and said stereoscope; said stereoscope being vertically over said mounting means, a carriage for supporting said marks in the field of view of the stereoscope, said carriage being movable in a horizontal plane, means for moving said marks vertically on said carriage, and means constraining said carriage to move so that every position of said marks is parallel to every other position, said stylus being attached to said carriage for tracing lines on said mapping surface in accordance with the movements of said carriage.

5. In a plotting device having means for mounting stereoscopic pictures, a stereoscope for viewing said pictures, a pair of spaced reference marks between said stereoscope and said mounting means, a mapping surface and a stylus; said stereoscope being vertically over said mounting means, means for changing the spaced relation of said marks, a carriage for supporting said marks in the field of view of the stereoscope, said carriage being movable horizontally, means for moving said marks vertically on said carriage, and means constraining said carriage to move so that every position of said marks is parallel to every other position, said mapping surface being fixed relative to said carriage, said stylus being attached to said carriage for tracing lines on said surface in accordance with the movements of said carriage.

6. In a plotting device having tables for mounting stereoscopic pictures, a stereoscope for viewing said pictures, a pair of reference marks between said tables and said stereoscope, a mapping surface, and a stylus; means for tipping and tilting each table about a point above its plane, means for swinging each table about a center point thereof, said stereoscope being vertically over said tables, a carriage supporting said marks in the field of view of the stereoscope, said carriage being movable horizontally, means for moving said marks vertically on said carriage, and means constraining said carriage to move so that every position of said marks is parallel to every other position, said mapping surface being fixed relative to said carriage, said stylus being attached to said carriage for tracing lines on said surface in accordance with the movements of said carriage.

7. In a plotting device having means for mounting stereoscopic pictures, a stereoscope for viewing said pictures, a pair of spaced reference marks between said mounting means and said stereoscope, a mapping surface, and a stylus; a carriage supporting said marks in the field of view of the stereoscope, said carriage being movable horizontally, means for moving said marks vertically on said carriage, means constraining said carriage to move so that every position of said marks is parallel to every other position, means adjustably supporting said mapping surface, said stylus being attached to said carriage for tracing lines on said surface in accordance with the movement of said carriage, and means for raising and lowering said stylus in and out of contact with said surface.

8. In a stereoscopic plotting device having reference marks, transparent discs, said reference marks being inscribed on said discs, brackets for supporting said discs, a bar for supporting said brackets, said brackets being movable on said bar, a frame for horizontally supporting said bar, and means for vertically moving said bar on said frame.

LAGE WERNSTEDT.